(12) United States Patent
Enenkl

(10) Patent No.: US 7,720,513 B2
(45) Date of Patent: May 18, 2010

(54) METHOD FOR OPERATING AN ELECTRONIC DEVICE, ELECTRONIC DEVICE, AND ELECTRONIC ASSEMBLY

(75) Inventor: Michael Enenkl, Stuttgart (DE)

(73) Assignee: SONY Deutschland GmbH, Berlin (DE)

( * ) Notice: Subject to any disclaimer, the term of this patent is extended or adjusted under 35 U.S.C. 154(b) by 440 days.

(21) Appl. No.: 11/682,468

(22) Filed: Mar. 6, 2007

(65) Prior Publication Data
US 2007/0268114 A1 Nov. 22, 2007

(30) Foreign Application Priority Data
May 17, 2006 (EP) ................................. 06010201

(51) Int. Cl.
*H04M 1/00* (2006.01)
*H04B 1/16* (2006.01)
(52) U.S. Cl. ..................... 455/572; 455/574; 455/343.1
(58) Field of Classification Search ................. 455/572, 455/574, 425, 517, 67.11, 573, 127.5, 343.1, 455/343.5
See application file for complete search history.

(56) References Cited

U.S. PATENT DOCUMENTS

| | | | |
|---|---|---|---|
| 3,713,148 A | | 1/1973 | Cardullo et al. |
| 5,845,204 A | * | 12/1998 | Chapman et al. .......... 455/343.1 |
| 6,353,749 B1 | * | 3/2002 | Siponen ....................... 455/574 |
| 6,525,666 B1 | | 2/2003 | Shimoda |
| 7,292,137 B2 | * | 11/2007 | Gilbert et al. ............. 340/426.3 |
| 7,454,634 B1 | * | 11/2008 | Donovan et al. ............. 713/322 |
| 2006/0068750 A1 | | 3/2006 | Burr |
| 2007/0130482 A1 | * | 6/2007 | Dahan et al. ................. 713/300 |

FOREIGN PATENT DOCUMENTS

EP          1 420 476 A1     5/2004

\* cited by examiner

*Primary Examiner*—Sonny Trinh
(74) *Attorney, Agent, or Firm*—Oblon, Spivak, McClelland, Maier & Neustadt, L.L.P.

(57) ABSTRACT

The present invention relates to a method for controlling an electronic device (10), to an electronic device (10) as such as well as to an electronic assembly (100). A key idea of the present invention is to provide a standby state in which no operation power is consumed with respect to processes of monitoring and terminating said standby state. The standby state can at most be terminated upon receipt of a remote wakeup radio signal (WS) from which also the operation power for terminating said standby state is extracted.

32 Claims, 2 Drawing Sheets

METHOD FOR OPERATING AN ELECTRONIC DEVICE, ELECTRONIC DEVICE, AND ELECTRONIC ASSEMBLY

FIELD OF THE INVENTION

The present invention relates to a method for controlling an electronic device, to an electronic device, as well as to an electronic assembly. More particular, the present invention relates to equipment realizing a 0 Watt standby.

BACKGROUND OF THE INVENTION

In many electronic consumer devices besides the active states or operational states of the devices certain standby states are usually realized in order to allow the user to remotely control switching on and off the respective devices. However, such standby states suffer from the respective amount of idle power consumption, i.e. respective parts of the equipment contained in the electronic device, i.e. certain electric circuits consume power in order to keep the standby operation of the equipment.

SUMMARY OF THE INVENTION

It is an object underlying the present invention to provide a method for controlling an electronic device, an electronic device as well as an electronic assembly which provide standby states in which no power consumption is given, at least with respect to processes of monitoring and terminating the standby state.

One key idea of the present is to avoid power consumption during a standby state.

Another key idea is to extract operation power necessary during a standby state—e.g. for monitoring and/or for terminating said standby state—from a received remote wake up radio signal.

According to the present invention method for controlling and/or for operating an electronic device is provided wherein during operation of said electronic device said electronic device is controllably switched or switchable between at least one active step and at least one standby state, wherein in said standby state no operation power is consumed at least with respect to processes of terminating or monitoring said standby state, wherein said standby state is terminated and said active state is entered at most upon receipt of a remote wakeup radio signal, and wherein the operation power terminating said standby state is extracted from said received remote wakeup radio signal.

According to a further aspect of the present invention an electronic device is provided which is adapted and which comprises means in order to be controlled and/or operated by a method for controlling and/or for operating an electronic according to the present invention.

According to a further aspect of the present invention an electronic assembly is provided which comprises an electronic device according to the present invention and a remote control means which is adapted and which comprises means for providing said remote wakeup radio signal.

BRIEF DESCRIPTION OF THE DRAWINGS

The invention will now be explained based on preferred embodiments thereof and by taking reference to the accompanying and schematical figures.

DETAILED DESCRIPTION OF THE INVENTION

Figure 1:
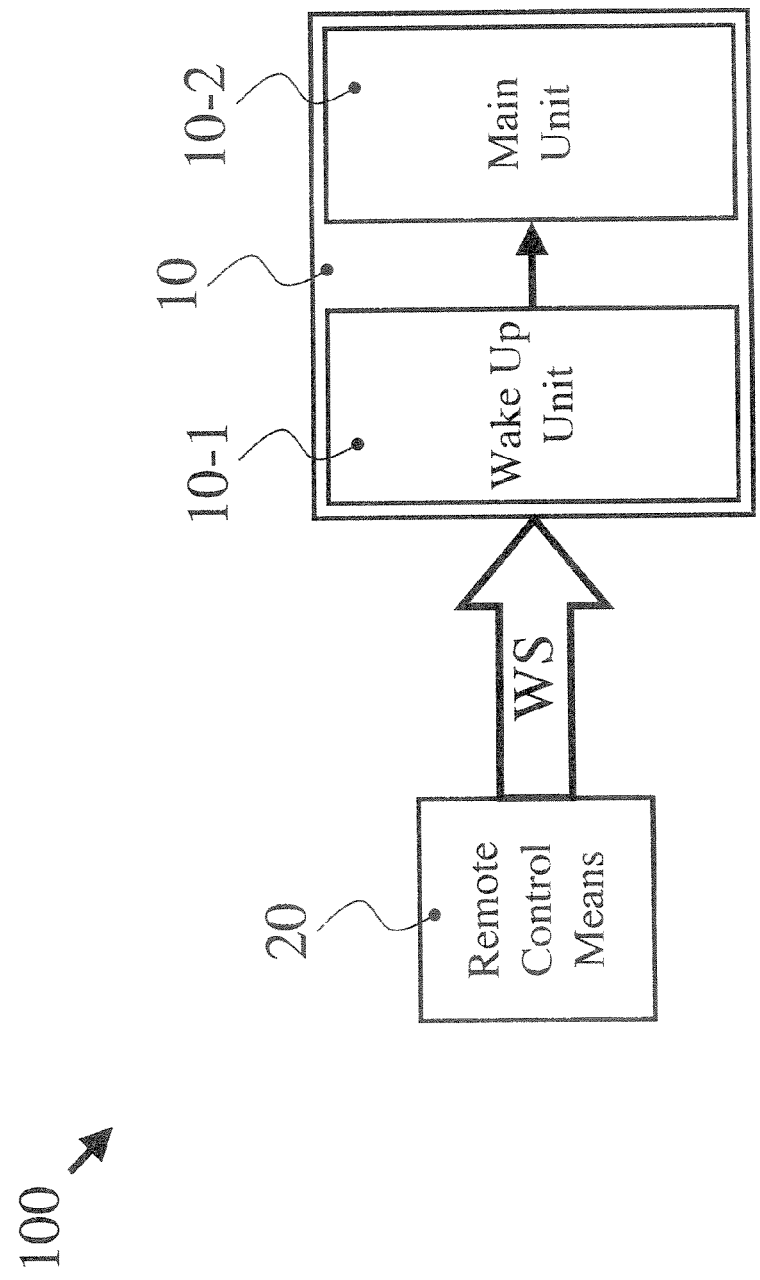
FIG. 1 is a schematical block diagram for elucidating some basic aspects of a first preferred embodiment of the present invention.

In the following functional and structural similar or equivalent element structures will be denoted with the same reference symbols. Not in each case of their occurrence a detailed description will be repeated.

According to the present invention a method for controlling an electronic device 10 is provided wherein during operation of said electronic device 10 said electronic device 10 is controllably switched or switchable between at least one active step and at least one standby state, wherein in said standby state no operation power is consumed at least with respect to processes of terminating or monitoring said standby state, wherein said standby state is terminated and said active state is entered at most upon receipt of a remote wakeup radio signal WS, and wherein the operation power terminating said standby state is extracted from said received remote wakeup radio signal WS.

During said standby state no operation power at all may be consumed.

During said standby state said electronic device 10 may be switched off.

During or after receipt of said remote wakeup radio signal WS said remote wakeup radio signal WS is analyzed.

Said standby state may be resumed or a locked state is entered if said remote wakeup radio signal WS does not contain a certain identification code ID assigned to said electronic device 10.

Said active state may be entered if said remote wakeup radio signal WS contains a certain identification code ID assigned to said electronic device 10.

An identification code ID may be used which is unique for said electronic device 10.

Said remote wakeup signal WS may be generated at a first site in order to comprise a first identification code ID1.

Said remote wakeup radio signal WS may be analyzed at a second site, in particular remote from said first site.

Said standby state may be resumed or a locked state may be entered if said first identification code ID1 does not contain and is not identical to a certain identification code ID assigned to said electronic device 10.

If said first identification code ID1 contains or is identical to a certain identification code ID, in particular assigned to said electronic device 10, a re-identification process with respect to said first site or with respect to said electronic device 10 may be performed.

In said re-identification process a second identification code ID2 may be generated at and transmitted by said second site, said second identification code ID2 re-identifying said second site or said electronic device 10.

Said second identification code ID2 may be received at and analyzed by the second site.

If said second identification code ID2 unambiguously identifies said second site or said electronic device 10, a third identification code ID3 assigned to said electronic device 10 and to a certain process to be initiated in said electronic device 10 may be generated at and transmitted by said first site.

Said third identification code ID3 may be taken from a list of potential third identification codes assigned to said electronic device 10 and then cancelled from said list of potential third identification codes, thereby updating said list of potential third identification codes.

Said third identification code ID3 may be received at and analyzed by said second site.

Said standby state may be resumed or a locked state is entered if said third identification code ID3 is not and does not contain a certain identification code assigned to said electronic device 10.

Said active state may be entered if said third identification code (ID3) is or contains a certain identification code assigned to said electronic device (10), in particular taken from a list of potential third identification codes, in which case the received third identification code (ID3) is cancelled from said list of potential third identification codes, thereby updating said list of potential third identification codes.

After receipt of said remote wakeup radio signal WS and an initial operation power extraction an internal power source 15, 18 may be switched on to further provide operation power for further processing.

According to a further aspect of the present invention an electronic device 10 is provided which is adapted and which comprises means in order to be controlled and/or operated by a method according to the present invention.

During said operation controllably electronic device 10 may be switchable between at least one active state and at least one standby state.

Said electronic device 10 may be adapted in order to consume in said standby state no operation power at least with respect to processes of terminating or monitoring said standby state.

Said electronic device 10 may be adapted in order to terminate said standby state and to enter said active state at most upon receipt of a remote wakeup radio signal WS.

Said electronic device 10 may be adapted in order to extract operation power for terminating said standby state from said received remote wakeup radio signal WS.

Said electronic device 10 may comprise an antenna 11 for receiving said remote wakeup radio signal WS.

Said electronic device 10 may comprise an power extraction means 12 connected to said antenna 11 and adapted and comprising means for extracting operation power from said received remote wakeup radio signal WS.

Said electronic device 10 may comprise a wakeup power source 15 which can be activated as an internal power source upon receipt of said remote wakeup radio signal WS and upon initial operation power extraction for providing further operation power for further processing.

Said wakeup power source 15 may be one of the group consisting of a battery, an accumulator, a capacitor, and a gold capacitor.

Said electronic device 10 may comprise first switching means 14 which is connected to said energy extraction means 12 and to said wakeup power source 15 in order to controllably switch on and connect said wakeup power source 15 for further providing operational power for further processing.

Said electronic device 10 may comprise code detection means 13 which is connected with said antenna 11 and which is adapted and comprises means for detecting within said received remote wakeup radio signal WS a contained code.

Said code detection means 13 may comprise a received code storing means for receiving and storing a code detected and extracted from said received remote wakeup radio signal WS, an assigned identification code storing means which contains an identification code ID which is assigned to said electronic device 10, and a comparison means for comparing said received code and said assigned identification code ID and for providing a control signal which is generated and designed depending on identity or non-identity of said received code with respect to said assigned identification code ID.

Said code detection means 13 may comprise a control line for providing said control signal of said code detection means 13.

Said electronic device 10 may comprise a main circuit 17, a main power supply 18 and second switching means 16, wherein said second switching means 16 may be provided between and connected to said main circuit 17 and said main power source 18 and which may be controllable, in particular via said control line of said code detection means 13, by said code detection means 13.

Said code detection means 13 may be adapted in order to switch on said second switching means 16 by appropriately generating a control signal for the case that the received code and the assigned identification code ID coincide in order to connect the main power source 18 with the main circuit 17 to thereby switch said electronic device 10 to said active state.

Said code detection means 13 may be adapted in order to keep off said second switching means 16 by appropriately generating a respective control signal for the case that said received code does not coincide with said assigned identification code ID in order to have disconnected said main circuit 17 and said main power source 18 to keep said electronic device 10 in said standby state or switched off.

According to still a further aspect of the present invention an electronic assembly 100 which may comprise an electronic device 10 according to the present invention and a remote control means 20 which is adapted and which comprises means for providing said remote wakeup radio signal WS.

Said remote control means 20 may comprise an antenna 21 for transmitting said remote wakeup radio signal WS.

Said remote control means 20 may comprise a radio signal generating means 22 which is connected to said antenna 21 and which is adapted and which comprises means for appropriately generating said remote wakeup radio signal WS.

Said remote control means 20 may comprise a code generating means 23 in order to generate and provide a code to be included in and transmitted within said re-mote wakeup radio signal WS.

These and further aspects of the present invention will be further discussed in the following:

The present invention also relates to a 0 Watt standby

Usually the standby circuit of electrical equipment needs some standby power to be able to switch on.

The 0 Watt standby enables the electrical equipment to be switched on without any power consumption during the standby phase.

The remote unit that actually switches on the equipment will transmit an RF wave to the receiver, which will carry the necessary energy to switch on the recognition circuit. To avoid any misdetection, the RF contains a code that ensures, that only the intended device will switch on.

Currently other equipment manufacturers use electric circuits, that consume power to keep the standby operation of an equipment. The market demands are to reduce this power to the minimum for environmental reasons.

The invention enables to create a system to remotely switch on an electrical equipment, that consumed no power (0 Watt) during the standby phase.

To be sure only the intended device will switch on, the system uses a unique key for the transmission.

To switch on the electric device, the remote unit will transmit a radio wave (RF) to the receiver.

This wave's energy will be used to activate the circuit inside the equipment.

This internal circuit's power shall be taken from an energy buffer (like gold capacitors or accumulators), which were previously charged during the ON time of the equipment.

The transmitted RF wave contains a code, which can be unique for each single equipment.

Once the circuit will be activated, a device, that checks the transmitted code, will be activated.

If the check fails, this device will switch off the circuit.

If the check is valid, this device will activate a stronger switch (e.g. relay, MOS-FET) to fully power on the electric device.

In the following, again reference is taken to the FIGS.

FIG. 1 demonstrates by means of a schematic block diagram some basic aspects of a first preferred embodiment of the present invention.

Therefore, FIG. 1 shows an electronic assembly 100 according to the present invention. Said electronic assembly is formed by an electronic device 10 which can be controlled in an operational sense by a remote control means 20. Said electronic device 10 is formed by a wakeup unit 10-1 and by a main unit 10-2. The main unit 10-2 of the electronic device 10 is adapted to realize the main processing aspects of said electronic device, whereas the wakeup unit 10-1 is adapted to wakeup, i.e. to switch on the main unit 10-2 for the case that the entire electronic device 10 has previously been switched into a standby state. The wakeup unit 10-1 is adapted in order to wakeup said main unit 10-2 for the case that a remote wakeup radio signal WS is received. This is done by receiving said remote wakeup radio signal WS and to extract from the received remote wakeup radio signal WS a certain amount of energy or power in order to provide therefrom the respective necessary operational power and if and only if the remote wakeup radio signal WS fits to the respective electronic device 10, for instance by checking whether within said remote wakeup radio signal WS a respective identification code is included which corresponds or coincides with an assigned identification code belonging to the respective electronic device 10. The whole process of waking up the electronic device, i.e. switching from the standby state to an active operational state, is initiated by having operated the remote control means 20, for instance by a user.

After having operated the remote control means 20 the respective remote wakeup radio signal WS is generated and transmitted in order to be received and absorbed by the wakeup unit 10-1 of the electronic device 10.

Figure 2:
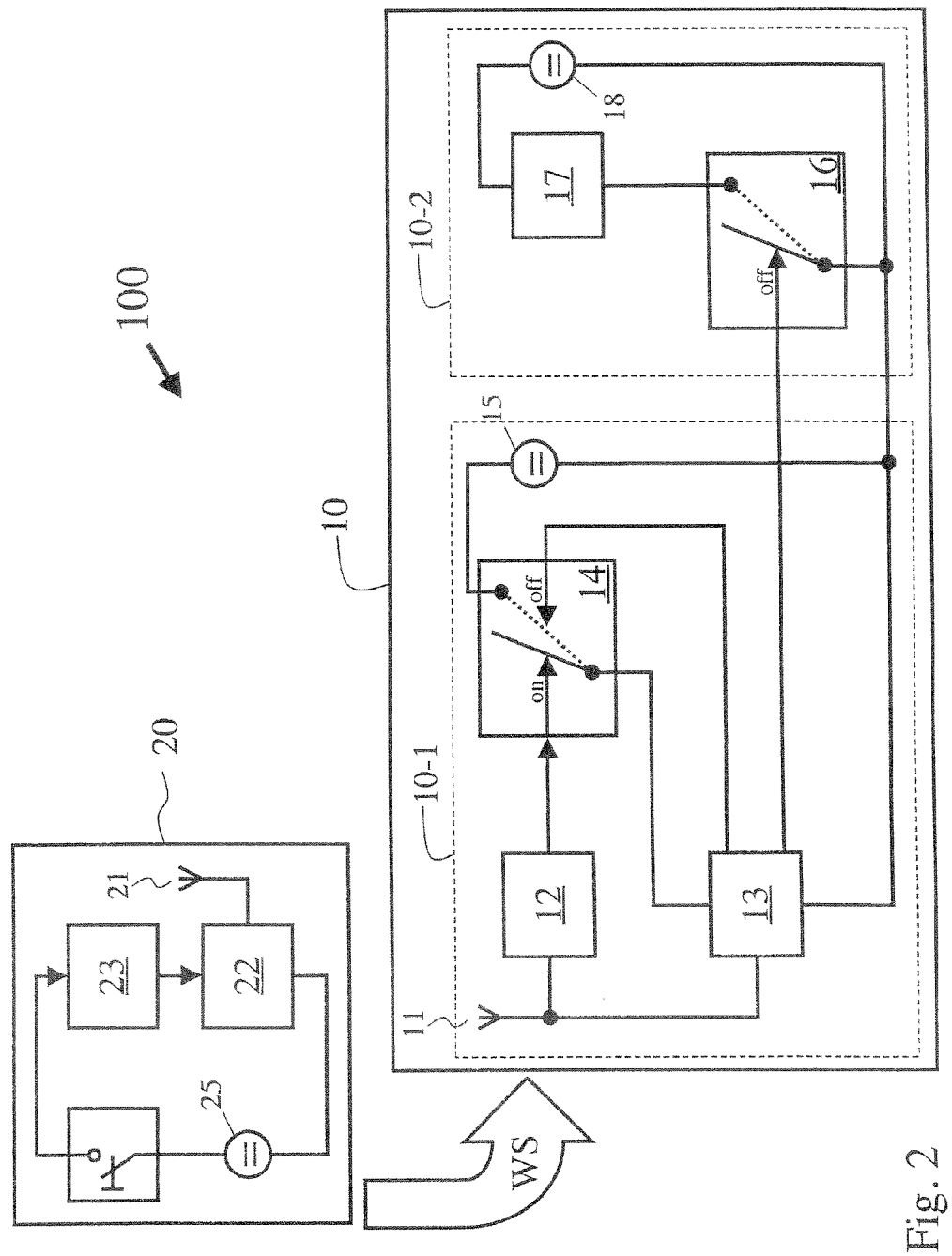
FIG. 2 is a schematical block diagram for elucidating some basic aspects of a second preferred embodiment of the present invention.

In the block diagram of FIG. 2 a more detailed structure for an electronic assembly 100 according to the present invention is demonstrated.

FIG. 2 shows an electronic assembly 100 according to the present invention. Said electronic assembly is formed by an electronic device 10 which can be controlled in an operational sense by a remote control means 20. Said electronic device 10 is formed by a wakeup unit 10-1 and by a main unit 10-2. The main unit 10-2 of the electronic device 10 is adapted to realize the main processing aspects of said electronic device, whereas the wakeup unit 10-1 is adapted to wakeup, i.e. to switch on the main unit 10-2 for the case that the entire electronic device 10 has previously been switched into a standby state. The wakeup unit 10-1 is adapted in order to wakeup said main unit 10-2 for the case that a remote wakeup radio signal WS is received. This is done by receiving said remote wakeup radio signal WS and to extract from the received remote wakeup radio signal WS a certain amount of energy or power in order to provide there from the respective necessary operational power and if and only if the remote wakeup radio signal WS fits to the respective electronic device 10, for instance by checking whether within said remote wakeup radio signal WS a respective identification code is included which corresponds or coincides with an assigned identification code belonging to the respective electronic device 10. The whole process of waking up the electronic device, i.e. switching from the standby state to an active operational state, is initiated by having operated the remote control means 20, for instance by a user. After having operated the remote control means 20 the respective remote wakeup radio signal WS is generated and transmitted in order to be received and absorbed by the wakeup unit 10-1 of the electronic device 10.

In the embodiment of FIG. 2 the main unit 10-2 of the electronic device 10 is formed by a main circuit 17 and a main power supply or power source 18 which are electrically connected via the respective power switch 16 which is formed by a respective second switching means 16. The second switching means or power switch 16 is controlled by the respective wakeup unit 10-1 of the electronic device 10.

The wakeup 10-1 of the electronic device 10 comprises an antenna 11 which is adapted in order to receive a remote wakeup radio signal WS which is wirelessly transmitted and received. An energy extraction and conversion means 12 as well as a code detection means 13 are provided each of which having input terminals which are connected to the antenna 11 in order to in each case receive at least a part of the received remote wakeup radio signal WS. The energy extraction and conversion means 12 extracts from the received remote wakeup radio signal WS a certain amount of energy or power to provide the same as operational power for the initial stage of the wakeup cycle, i.e. for the cycle enabling switching from a standby state to an active and operational state of the electronic device 10. According to the converted and extracted energy or power a respective first switching means 14 contained in said wakeup unit 10-1 is operated in order to switch a provided wakeup power source 15 to the code detection means 13 which in turn after activation checks the incoming remote wakeup radio signal WS for any contained information or code sequence. After comparison of the extracted information from the remote wakeup radio signal WS with a respective identification code assigned to the electronic device 10 a control signal is generated in order to provide said control signal to the second switching means 16 or power switch 16 for the case that the extracted identification code contained in said remote wakeup radio signal WS and said assigned identification code are identical or coincide and for keeping said second switching means 16 in an off-state for the case that both codes do not coincide.

FIG. 2 also shows the remote control means 20 for generating and transmitting an RF wave as a remote wakeup radio signal WS containing energy and a respective code sequence. Therefore, said remote control means 20 comprises an transmission antenna 21 which is connected to a provided RF or remote wakeup radio signal generating means 22. Said RF or remote wakeup radio signal generating means 22 is connected to a code generating means 23 as well as to a respective power source 25. The code generating means 23 generates a respective possible identification code in superposition to the RF wave generated by said RF or remote wakeup radio signal generating means 22.

| Reference Symbols | |
|---|---|
| 10 | electronic device according to the present invention |
| 10-1 | wakeup unit |
| 10-2 | main unit |
| 11 | receiving antenna, antenna |
| 12 | energy/power extracting/conversion means |
| 13 | code detection means |
| 14 | first switching means |
| 15 | wakeup power supply/source |
| 16 | second switching means, power switch |
| 17 | main circuit |
| 18 | main power supply/source |
| 20 | remote control means |
| 21 | transmission antenna, antenna |
| 22 | RF generating means, remote wakeup radio signal generating means |
| 23 | code generating means |
| 25 | power supply/source |
| 100 | electronic assembly according to the present invention |
| ID | assigned identification code |
| WS | Remote wakeup radio signal |

The invention claimed is:

1. A method for controlling an electronic device comprising:

during operation of said electronic device, controllably switching said electronic device between an active state and a standby state, wherein in said standby state no operation power is consumed at least with respect to processes of terminating or monitoring said standby state, terminating said standby state and entering said active state upon receipt of a remote wakeup radio signal (WS), extracting the operation power for terminating said standby state from said received remote wakeup radio signal (WS), analyzing, during or after receipt of said remote wakeup radio signal (WS), said remote wakeup radio signal (WS), and determining whether or not said remote wakeup radio signal (WS) contains a certain identification code (ID) assigned to said electronic device, and controllably switching said electronic device between the active state and the standby state based on the determination.

2. The method according to claim 1, wherein during said standby state no operation power at all is consumed.

3. The method according to claim 1, wherein during said standby state said electronic device is switched off.

4. The method according to claim 1, wherein said standby state is resumed or a locked state is entered if said remote wakeup radio signal (WS) does not contain the certain identification code (ID) assigned to said electronic device.

5. The method according to claim 1, wherein said active state is entered if said remote wakeup radio signal (WS) contains the certain identification code (ID) assigned to said electronic device.

6. The method according to claim 1, wherein the identification code (ID) is unique for said electronic device.

7. The method according to claim 1, wherein said remote wakeup signal (WS) is generated at a first site and comprises a first identification code (ID1).

8. The method according to claim 7, wherein said remote wakeup radio signal (WS) is analyzed at a second site, which is remote from said first site.

9. The method according to claim 7, wherein said standby state is resumed or a locked state is entered if said first identification code (ID1) does not contain and is not identical to the certain identification code (ID) assigned to said electronic device.

10. The method according to claim 8, wherein if said first identification code (ID1) contains or is identical to the certain identification code (ID) assigned to said electronic device a re-identification process with respect to said first site or with respect to said electronic device is performed.

11. The method according to claim 10, wherein in said re-identification process a second identification code (ID2) is generated at and transmitted by said second site, said second identification code (ID2) re-identifying said second site or said electronic device.

12. The method according to claim 11, wherein said second identification code (ID2) is received at and analyzed by the second site and wherein if said second identification code (ID2) unambiguously identifies said second site or said electronic device a third identification code (ID3) assigned to said electronic device and to a certain process to be initiated in said electronic device is generated at and transmitted by said first site.

13. The method according to claim 12, wherein said third identification code (ID3) is taken from a list of potential third identification codes assigned to said electronic device and then cancelled from said list of potential third identification codes, thereby updating said list of potential third identification codes.

14. The method according to claim 13, wherein said third identification code (ID3) is received at and analyzed by said second site and wherein said standby state is resumed or a locked state is entered if said third identification code (ID3) is not and does not contain a certain identification code assigned to said electronic device.

15. The method according to claim 14, wherein said active state is entered if said third identification code (ID3) is or contains the certain identification code assigned to said electronic device, in particular taken from the list of potential third identification codes, in which case the received third identification code (ID3) is cancelled from said list of potential third identification codes, thereby updating said list of potential third identification codes.

16. The method according to claim 1, wherein after receipt of said remote wakeup radio signal (WS) and an initial operation power extraction, an internal power source is switched on to further provide operation power for further processing.

17. An electronic device comprising:

a wakeup unit configured to controllably switch said electronic device between an active state and a standby state, wherein in said standby state no operation power is consumed at least with respect to processes of terminating or monitoring said standby state, and said wakeup unit is configured to terminate said standby state and enter said active state upon receipt of a remote wakeup radio signal (WS), an extracting unit configured to extract the operation power for terminating said standby state from said received remote wakeup radio signal (WS), an analyzing unit configured to analyze, during or after receipt of said remote wakeup radio signal (WS), said remote wakeup radio signal (WS), and to determine whether or not said remote wakeup radio signal (WS) contains a certain identification code (ID) assigned to said electronic device, wherein said wakeup unit switches said electronic device between the active state and the standby state based on the determination.

18. The electronic device according to claim 17, wherein in said standby states, no operation power at least with respect to processes of terminating or monitoring said standby state is consumed.

19. The electronic device according to claim 17, further comprising:
an antenna configured to receive said remote wakeup radio signal (WS).

20. The electronic device according to claim 19, further comprising:
a code detection means which is connected with said antenna and which comprises means for detecting within said received remote wakeup radio signal (WS) a contained code.

21. The electronic device according to claim 20, wherein said code detection means comprises:
a received code storing means for receiving and storing a code detected and extracted from said received remote wakeup radio signal (WS),
an assigned identification code storing means which contains an identification code (ID) which is assigned to said electronic device, and
a comparison means for comparing said received code and said assigned identification code (ID) and for providing a control signal which is generated and de-signed depending on identity or non-identity of said received code with respect to said assigned identification code (ID).

22. The electronic device according to claim 21, wherein said code detection means comprises a control line for providing said control signal of said code detection means.

23. The electronic device according to claim 22, further comprising:
a main circuit, a main power supply and second switching means,
wherein said second switching means is provided between and connected to said main circuit and said main power source and is controllable, in particular via said control line of said code detection means, by said code detection means.

24. The electronic device according to claim 23, wherein said code detection means is adapted in order to switch on said second switching means by appropriately generating a control signal for the case that the received code and the assigned identification code (ID) coincide in order to connect the main power source with the main circuit to thereby switch said electronic device to said active state.

25. The electronic device according to claim 23, wherein said code detection means is adapted in order to keep off said second switching means by appropriately generating a respective control signal for the case that said received code does not coincide with said assigned identification code (ID) in order to have disconnected said main circuit and said main power source to keep said electronic device in said standby state or switched off.

26. The electronic device according to claim 17, further comprising:
a wakeup power source which can be activated as an internal power source upon receipt of said remote wakeup radio signal (WS) and upon initial operation power extraction for providing further operation power for further processing.

27. The electronic device according to claim 26, wherein said wakeup power source is one of a group consisting of a battery, an accumulator, a capacitor, and a gold capacitor.

28. The electronic device according to claim 27, further comprising:
a first switching means which is connected to said extraction unit and to said wakeup power source in order to controllably switch on and connect said wakeup power source for further providing operational power for further processing.

29. An electronic assembly, comprising:
the electronic device according to claim 17 and
a remote control means which is adapted and which comprises means for providing said remote wakeup radio signal (WS).

30. The electronic assembly according to claim 29, wherein said remote control means comprises an antenna for transmitting said remote wakeup radio signal (WS).

31. The electronic assembly according to claim 30, wherein said remote control means comprises a radio signal generating means which is connected to said antenna and which is adapted and which comprises means for generating said remote wakeup radio signal (WS).

32. The electronic assembly according to claim 30, wherein said remote control means comprises a code generating means in order to generate and provide a code to be included in and transmitted within said remote wakeup radio signal (WS).

* * * * *